United States Patent [19]
Izumi

[11] Patent Number: 5,383,276
[45] Date of Patent: Jan. 24, 1995

[54] ANGLE TRISECTOR

[76] Inventor: John Y. Izumi, 22 W. 317 Glen Valley Dr., Glen Ellyn, Ill. 60137

[21] Appl. No.: 74,353

[22] Filed: Jun. 10, 1993

[51] Int. Cl.⁶ ............................................. B43L 9/08
[52] U.S. Cl. ..................................... 33/1 AP; 33/430
[58] Field of Search ................. 33/1 F, 1 AP, 15 B, 33/15 D, 430, 453, 464, 473; 235/78 M, 88 M, 616 M

[56] References Cited

U.S. PATENT DOCUMENTS

| | | | |
|---|---|---|---|
| 1,008,814 | 11/1911 | Goodfellow | 33/1 AP |
| 1,093,919 | 4/1914 | Dennis | 33/1 AP |
| 1,764,581 | 6/1930 | Shibuya | 33/1 AP |
| 1,851,744 | 3/1932 | Wellington | 235/616 M |
| 2,892,586 | 6/1959 | Graham | 33/1 AP |
| 3,224,097 | 12/1965 | Izumi | 33/1 AP |
| 3,370,354 | 2/1968 | Schiff | 33/1 AP |
| 3,486,232 | 12/1969 | Klauberg | 33/15 B |
| 3,535,788 | 10/1970 | Sena | 33/15 D |
| 3,693,261 | 9/1972 | Moore | 33/1 AP |
| 3,906,638 | 9/1975 | Romano | 33/1 AP |
| 3,919,777 | 11/1975 | Moore | 33/1 AP |
| 4,545,130 | 10/1985 | Corsette | 33/474 |
| 4,866,848 | 9/1989 | Agelidis | 33/1 AP |
| 5,210,951 | 5/1993 | Chen | 33/1 AP |

FOREIGN PATENT DOCUMENTS 104282 3/1917 United Kingdom ............... 33/1 AP

OTHER PUBLICATIONS

Ogilvy, C. Stanley, *Excursions in Geometry*, "Angle trisection", Ch. 10, pop. 135–141 No Date.
Miller, Leslie, *College Geometry*, "Impossible Ruler and Compass Constructions", Ch. 12, pp. 193–197 No Date.

*Primary Examiner*—Thomas B. Will
*Attorney, Agent, or Firm*—Marshall, O'Toole, Gerstein, Murray & Borun

[57] ABSTRACT

An angle trisecting device with a base section having two angle indicating scales and an elongated member with a straight edge portion. The elongated member is pivotally mounted on the base section. A given angle on one angle indicating scale coinciding with the straight edge portion corresponds to a trisected angle on the other angle indicating scale coinciding with the straight edge portion. Pivot pins extend from the elongated member and are removably captured in respective base slots to ensure reliable operation. In another embodiment a guide wall extends from the base to ensure reliable operation. An optional link arm is pivotally mounted to the base section and with one end pivotally mounted to the elongated member.

9 Claims, 3 Drawing Sheets

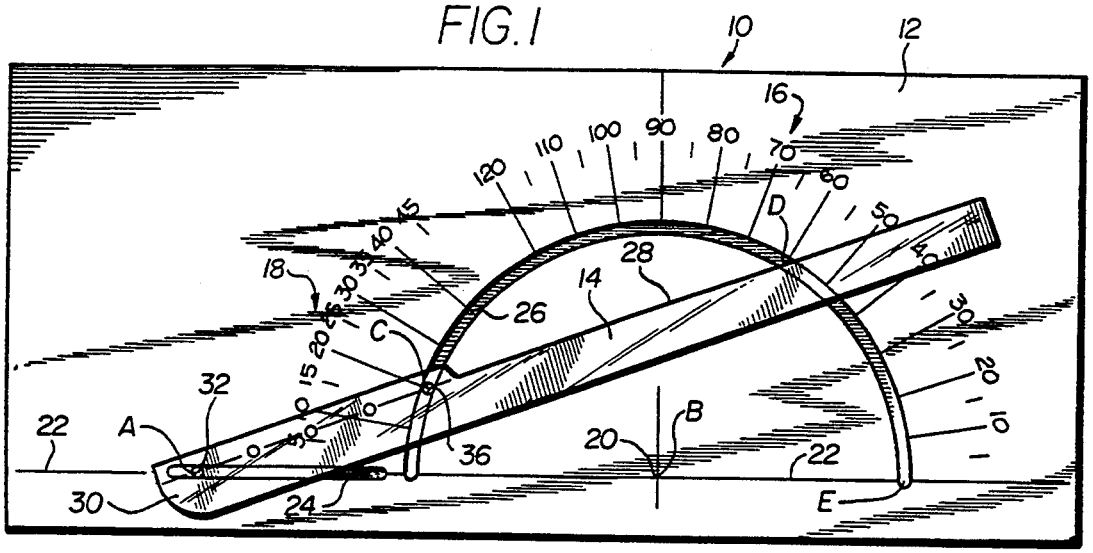
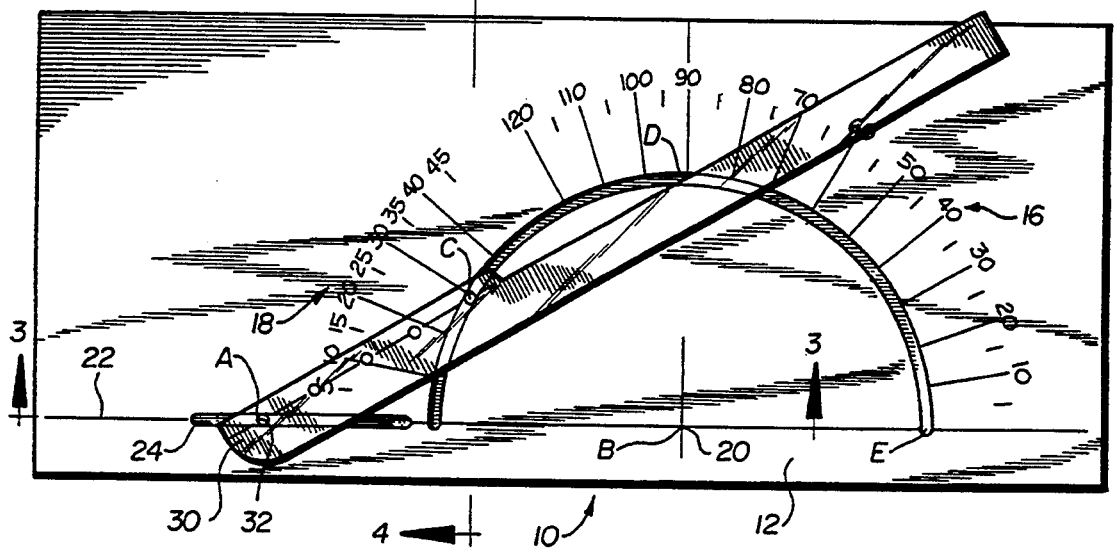
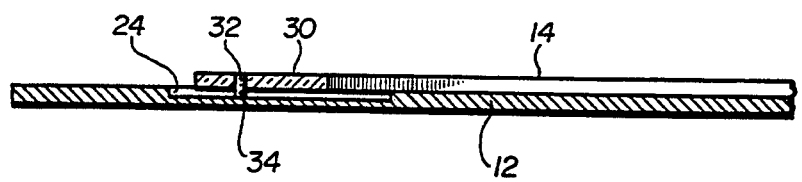
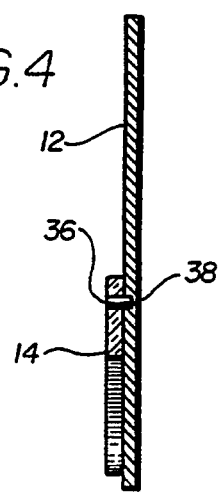

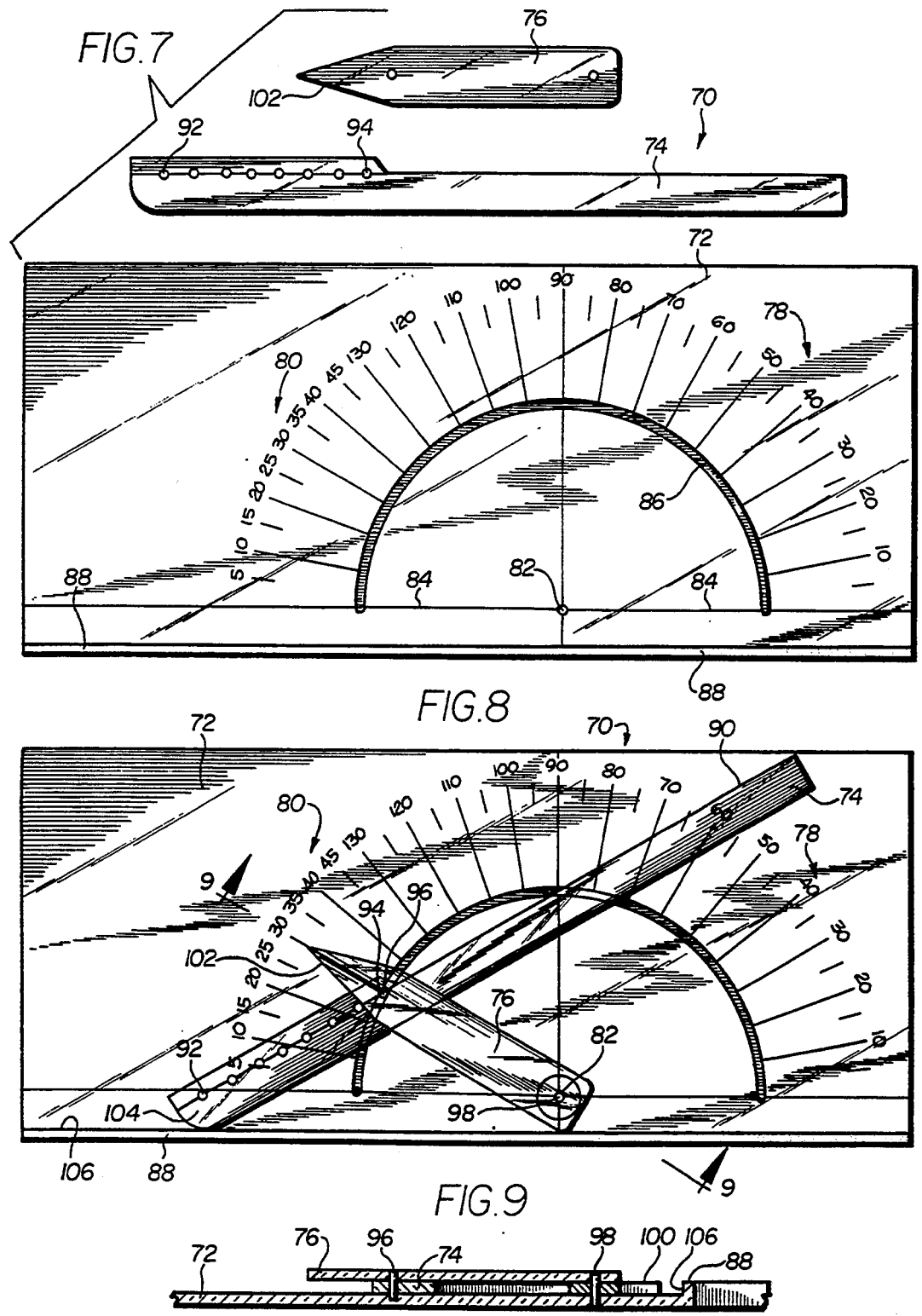

ANGLE TRISECTOR

This invention relates to geometric instrument apparatus particularly suitable for trisecting or triplicating any given angle.

BACKGROUND OF THE INVENTION

Attempting to trisect an angle using an unmarked ruler and compass has been a long-standing problem of considerable interest. Reference may be made to the text of C. Stanley Ogilvy, "Excursions In Geometry", pages 135-141, wherein this is referred to as one of "The Unsolved Problems Of Antiquity"; and to the text of Leslie Miller, "College Geometry", pages 193-197, wherein this is referred to as "Impossible Ruler and Compass Constructions".

It is possible, however, to provide geometric instruments that will trisect angles. In my prior U.S. Pat. No. 3,224,097 there is illustrated a geometric instrument which can be used for providing an indication of an angle which is one-third of a given angle, i.e. trisected, or in the alternative for providing an indication of an angle which is three times a given angle, i.e. triplicated.

In my aforementioned patented geometric instrument, there is provided a base with three pivotally connected members on the base. In particular, there is included a base having a slot extending in a straight path. A guide member has one end secured within the slot and is adapted for rotational and longitudinal movement about the slot. The guide member has an elongated slot extending inwardly from its outer free end toward a point of sliding connection with the base member slot. A pair of equal length link members each have one end pivotally connected to the base member at a common point for pivoting relative thereto. One of the link members is pivotally connected to the guide member at a point on the guide member inwardly of the slot and spaced from the point of pivotal connection to the guide member within the slot by a distance which corresponds to the length of the first link to the guide member.

The second link member has its outer end connected for slidable movement within the slot of the guide member. An angle indicating scale extends outwardly from the end of each of the link members for indicating the instantaneous angular position thereof relative to a reference line extending through the length of the slot in the base member and the point of pivotal connection of the links. Accordingly, with rotation of the links, one end of one link slides within the slotted portion of a guide means and simultaneously the slidable connection of the guide means moves within the slot. The pointer associated with one link indicates an angular position relative to the path of the base slot which is three times the angle indicated by the angle scale indicator.

Following the issuance of my '097 patent, several other patents of others have issued illustrating angle dividing and trisecting devices. Reference may be made for instance to the following U.S. Pat. Nos. of interest: 3,693,261; 3,906,638; 3,919,777; 4,545,130; 4,866,848.

All of the aforementioned patents contain several components all of which must be manufactured and then assembled into the composite instrument. For instance, in my '097 patent, there is included a base plate with slots, a guide member with a slot, and two link members all of which must be assembled as described in the patent to provide reliable trisection of an angle.

It is now desired to provide a precise geometric instrument for trisecting angles which has less components and is easier to manufacture and assemble. It is also desired to manufacture an improved geometric instrument for trisecting angles which is less expensive to manufacture and easier to operate than any of the presently known devices, while at the same time providing a precise angle trisecting and angle triplicating indication.

SUMMARY OF THE INVENTION

In accordance with the principles of the present invention, there is provided a geometric instrument for trisecting (or triplicating) angles having only two components, a base section having an angle indicating scale, and an elongated member with a straight edge portion. In the preferred embodiment of the invention, the elongated member has one end removably captured for slidable movement within a base slot and a second portion of the elongated member which is removably captured within a circular slot on the base. Pivoting of the elongated member on the base so that a straight edge coincides with one angular scale corresponding to one angle will provide a trisected angular indication along the straight edge at a second angular scale portion.

In particular, in the preferred embodiment of the invention, an angle trisecting device has a base including a flat portion. Angle indicating means on the base extending outwardly from a center point on the base. A circular slot is provided on the base with the center point being the center of the circular slot. The circular slot cooperates with the angle indicating means to provide angle indication points from a zero angle reference axis. An elongated slot in the base is aligned with the center point and the zero angle reference axis. An elongated member has an elongated straight edge portion and a defined length portion at one end of the elongated member, the defined length portion is adapted to be equal to the radius of the circular slot.

The defined length portion has a base reference point and an angle reference point at opposite ends. A first pin extends from the base reference point and is removably captured within the elongated base slot, and a second pin extends through the angle reference point and is removably captured within the circular slot.

Pivotal movement of the elongated member with respect to the elongated base slot and the circular slot enables a given angle coinciding with the elongated straight edge portion of the elongated member and the angle indication point on the circular slot to correspond to the trisected angle shown at the angle reference point coinciding with the angle indication point at the circular slot.

In another embodiment of the invention, there is provided a base including a flat portion and an upstanding guide wall along one base end. Angle indicating scale means on the base extend outwardly from a center point on the base. A circular indicia on the base is provided with the center point of the angular scale being the center of the circular indicia and cooperating with the angle indicating scale to provide angle indicating points from a zero angle reference axis. An elongated member has an elongated straight edge portion and a defined length portion at one end of the elongated member equal to the radius of the circular indicia. The defined length has a base reference point and an angle reference point at an opposite end and means for insuring that when the elongated member one end abuts the upstanding guide wall, the base reference point is on a line extending through the center point and the zero angle reference axis, and the angled reference point coincides with the angle indication point at the circular indicia. Thus, with the elongated member so positioned, the angle indication point on the circular indicia coincides with the elongated straight edge portion of the elongated member which corresponds to the trisected angle shown at the angled reference point coinciding with the circular indicia. It is understood, of course, that the triplicate of the given angle may be obtained rather than obtaining a trisected angle.

In still another embodiment of the invention, there is provided an angle trisector which combines several features of each of the aforementioned embodiments. In this alternative embodiment of the invention, if desired, a single link member is provided pivotable from a base center point. The opposite end of the optional link member is pinned to the elongated member and also captured within a circular slot in the base. The base includes a guide wall at one end. Thus, as the link member is pivoted around the base center point, the elongated member rotates about the pivoting connection with the link member while one end of the elongated member remains abutted to the guide wall. A given angle coinciding with the elongated member straight edge and an angle indicating scale is indicated as a trisected angle at one end of the link member.

The link arm is optional and need not be used. In that case the elongated member is pivotally pinned to the circular slot while one end of the elongated member remains abutted to the guide wall.

Accordingly, the present invention provides an angle trisector having only two components—a base containing angular indications in the nature of a protractor (with circular indicia in the nature of a compass), and a positionable elongated member with a straight edge from which one can readily obtain either the trisected angle or a triplicated angle.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

FIG. 1 is a plan view illustrating a preferred embodiment of a geometrical instrument useful as an angle trisector according to the invention;

FIG. 2 is a plan view illustrating the geometric instrument of FIG. 1 and showing a different trisected or triplicated angle than the FIG. 1 illustration;

FIG. 3 is a fragmented cross-sectional view taken along section lines 3—3 of FIG. 2;

FIG. 4 is a cross-sectional view taken along section lines 4—4 of FIG. 2;

FIG. 7 is an exploded view of a third embodiment of the invention and the illustrated components;

FIG. 8 is a plan view of the third embodiment in operation; and

FIG. 9 is a cross-sectional view taken along section lines 9—9 of FIG. 8.

DETAILED DESCRIPTION

Figure 5:
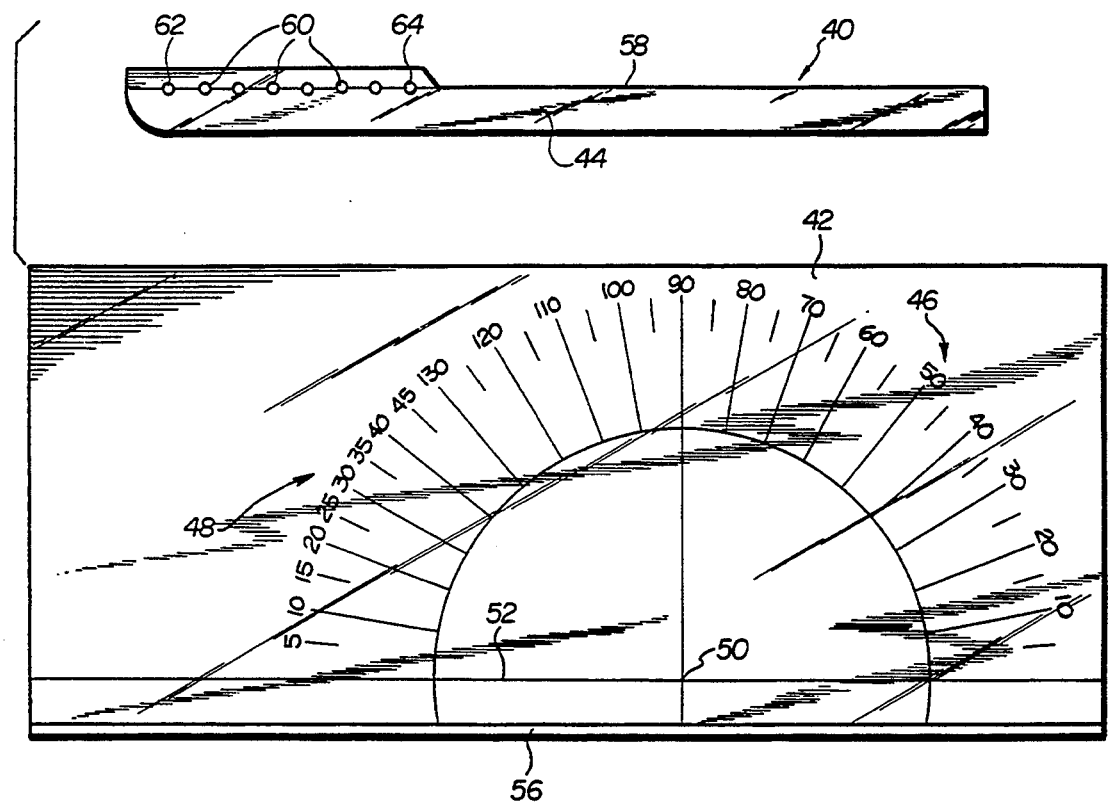
FIG. 5 is an exploded view illustrating a second embodiment of the invention.

The drawings illustrate several embodiments of the present invention showing a geometric instrument which is useful for trisecting an angle or for indicating a triplicate of a given angle. All of the embodiments provide an improved angle trisecting device having significant advantages in construction and operation compared to known instruments for these purposes.

Reference for instance may be made to the preferred embodiment shown in FIGS. 1–4 showing a geometric instrument 10 which has only two main components—a substantially flat base portion 12 in the nature of a protractor, and an elongated member 14. Base 12 includes two angle indicating scales 16, 18 each of which extends outwardly from a center point 20 and each of which is marked with increasing angles from a base zero angle reference line 22. The angle indicating scales and the base zero angle reference line may be suitably inscribed or otherwise marked as indicia on the top surface of base 12. The base and the elongated member may be formed of a transparent plastic material.

Base 12 further includes an elongated slot 24 which is aligned along the zero angle reference line 22. A circular slot 26 in the base has its center being center point 20. Circular slot 26 intersects each of the angle indicating scales 16, 18. As can be seen most clearly from FIGS. 1 and 2, angle indicating scale 16 extends from zero angle reference line 22 counter clockwise along circular slot 26 in increasing angles from 0° to 120°. At the other end of the base, angle indicating scale 18 extends in increasing angular indications from 0° at zero angle reference line 22 clockwise and continuing to 45° along circular slot 26.

Elongated member 14 has a straight edge 28 useful for indicating the trisected or triplicated angle in connection with scales 16, 18 as will be described more particularly hereinafter. For instance, as generally shown in FIGS. 1 and 2, straight edge 28 overlaps both scales 16 and 18. Elongated member 14 has an aperture at one end 30 through which is rigidly mounted a pin 32. Pin 32 has a portion 34 extending beyond the elongated member, which portion 34 is adapted to be removably captured within and to slide along slot 24 as the elongated member pivots about slot 24. Elongated member 14 includes another aperture to which is mounted a second pin 36 which includes a portion 38 extending from one side of elongated member 14 so as also to be removably captured within and to slide along circular slot 26 as the elongated member pivots.

The linear distance between pin 32 and pin 36 equals the radius of circular slot 26. Thus, the linear distance from pin 32 to pin 36 is the same as the radial distance from center point 20 to pin 36.

Accordingly, elongated member 14 is assembled for operation onto base 12 by inserting pin 32 into slot 24 and inserting pin 36 into circular slot 26. In operation, FIG. 1 illustrates that with elongated member 14 pivoting by means of pins 32, 36 and respective slots 24, 26, straight edge 28 placed on an angle indication of 60° on scale 16 at circular slot 26 also coincides with an angle indication of 20° on scale 18 at circular slot 26 as noted by pin 36. Thus, the angle indication on scale 16 has been trisected and indicated on scale 18.

As shown in FIG. 1, pin 32 is in line with straight edge 28 and is located at the intersection of the straight edge 28 and zero angle reference line 22. Also note that pins 32 and 36 are aligned with each other along the straight edge 28 and that pin 36 accurately defines the intersection of the straight edge with circular slot 26 at angle indicating scale 18. Accordingly, in the aforementioned example, angle 60° is shown as the trisected angle 20° at pin 36.

Elongated member 14 can be pivotally moved while maintaining pin 32 in slot 24 and pin 36 in slot 26. As a second example, reference may be made to FIG. 2 which illustrates movement of elongated member 14 so that straight edge 28 coincides with angle 90° on angle indicating scale 16 at the intersection of straight edge 28 and circular slot 26. The trisected angle of 30° is clearly shown at the intersection of straight edge 28 with circular slot 26 in connection with angle indicating scale 18 which coincides with the location of pin 36.

The proof of the two geometric operations shown in FIGS. 1 and 2 and utilizing geometric instrument 10 of the present invention may be found by the following, wherein points A, B, C, D, E are shown in FIGS. 1 and 2 for reference purposes. Point A coincides with pin 32; point B coincides with center point 20; point C coincides with pin 36; point D coincides with the intersection of straight edge 28 and circular slot 26 at angle indicating scale 16; and point E coincides with the intersection of circular slot 26 with zero angle reference line 22:

Triangle $\angle ACB = 180 - 2 \angle CAB$ (Isosceles Triangle CAB)
$= 180 - 2 \angle CBA$
Triangle $\angle CBD = 180 - 2 \angle BCD$ (Isosceles Triangle BCD)
$= 180 - 2 \angle BDC$
$180 = \angle CBA + \angle CBD + \angle DBE$
$180 = \angle CBA + 180 - 2 \angle BCD + \angle DBE$
$0 = \angle CBA - 2 \angle BCD + \angle DBE$
Triangle CAB
$\angle ACB = 180 - 2 \angle CAB$
$= 180 - 2 \angle CBA$
Straight Line ACD
$\angle ACB = 180 - \angle BCD$
$180 - 2 \angle CAB = 180 - \angle BCD$
$2 \angle CAB = \angle BCD$
$\angle DBE = 2 \angle BCD - \angle CBA$
$= 2(2 \angle CAB) - \angle CBA$
$\angle DBE = 4 \angle CAB - \angle CBA$
$\angle CBA = \angle CAB$ (Isosceles Triangle CAB)
$\angle DBE = 3 \angle CAB$ The significant advantage of the preferred embodiment of the present angle trisecting device shown in FIGS. 1-4 is the minimum of components, the ease of construction and assembly, and the ease in use and operation of the device while providing reliable and accurate indications of both trisected and triplicated angles. As noted in FIGS. 1-4, there are only basically two components, a base protractor-like element (or compass-like element) and an elongated straight edge element. Yet with these two components, one can readily, reliably and precisely obtain indications of both trisected and triplicated angles.

Figure 6:
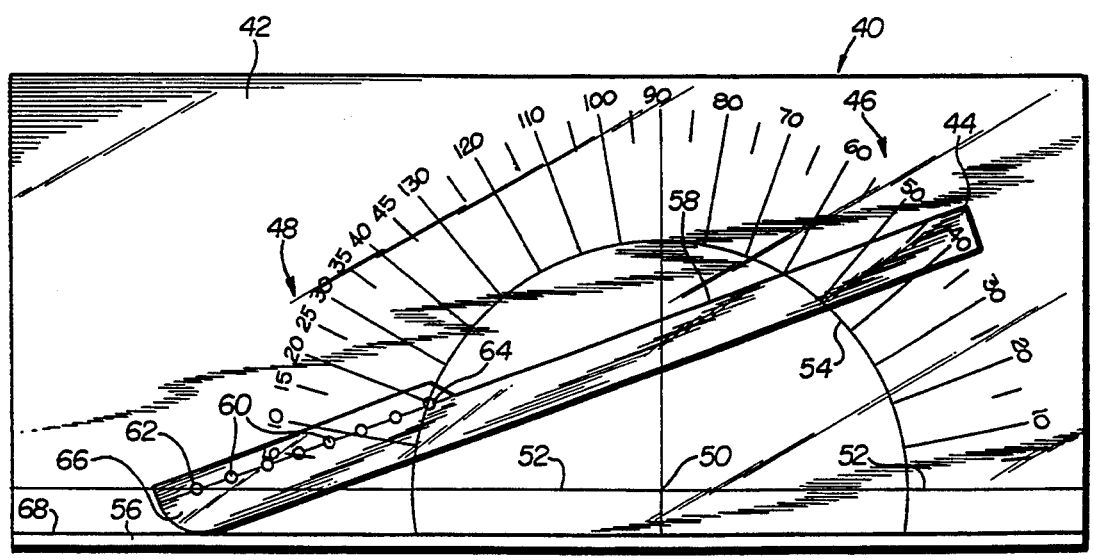
FIG. 6 is a plan view illustrating the second embodiment of the invention being used to obtain a trisected angle.

Reference may be made to FIGS. 5, 6 wherein there is illustrated a second embodiment of the invention showing a geometric instrument 40. Instrument 40 includes a base 42 and an elongated member 44. Base 42 has a first angle indicating scale 46 and a second angle indicating scale 48. Each of the angle scales is emanating from a center point 50. Each of the scales 46, 48 is measured from a zero angle reference line 52, i.e. scale 46 in a counter clockwise direction from zero angle reference line 52 and scale 48 in a clockwise manner from zero angle reference line 52.

A circular indicia 54 is inscribed or otherwise marked in the top surface of base 42 using center point 50 as the center of circle indicia 54. Base 42 includes a thin, upstanding guide wall 56 projecting slightly above the surface of base 42 and along one base perimeter.

Elongated member 44 includes a straight edge 58 which is aligned with a series of apertures 60 in one end of the elongated member. One of the apertures 60 serves as a base reference point 62 and another of the apertures serves as an angle reference point 64.

As can be seen most clearly from FIG. 6, elongated member end 66 is adapted such that when the edge of end 66 abuts an upstanding surface 68 of guide wall 56, base reference point 62 is aligned with zero angle reference line 52, and angle reference point 64 coincides with circular indicia 54. As in the first embodiment, the linear distance between base reference point 62 and angle reference point 64 along straight edge 58 is equal to the radius of circular indicia 54. Accordingly, as shown in FIG. 6, straight edge 58 coincides with circular indicia 54 at angle 60° on scale 46 and also coincides with circular indicia 54 at angle reference point 64 on angle indicating scale 48 at an angle of 20°.

Elongated member 44 may be readily moved on base 42 to the position shown for instance in FIG. 2. In this embodiment, end 66 must be maintained abutting against surface 68 so that base reference point 62 still coincides with zero angle reference line 52.

Thus, the embodiment of FIGS. 5 and 6 is somewhat easier to manufacture as compared to the embodiment shown in FIGS. 1-4. However, in the second embodiment of FIGS. 5, 6, the user must make sure that end 66 is maintained in abutting relationship with surface 68 of guide wall 56 so that base reference point 62 is maintained on zero angle reference line 52 to ensure a reliable indication of the trisected and triplicated angles. For this reason, the embodiment shown in FIGS. 1-4 is preferred because movement of pins 32, 36 within respective slots 24, 26 ensures the proper angle trisecting operation of the instrument and avoids any possible mistake in use of the instrument.

Another embodiment of the invention is shown in FIGS. 7-9 wherein a geometric instrument 70 includes a base 72, an elongated member 74 and an optional link arm 76. Respective angle indicating scales 78, 80 are inscribed or otherwise marked on base 72 and are emanating from a center point 82. The scales are marked in angles from a zero angle reference line 84 in the same manner as described in connection with the two prior embodiments. Base 72 includes a circular slot 86 and an upstanding guide wall 88.

Elongated member 74 includes a straight edge 90 which is in line with a series of apertures in the elongated member including an aperture forming a base reference point 92 and an angle reference point 94. In assembling the units, a pin 96 is located through a suitable aperture in link arm 76 and through the aperture forming angle reference point 94 in elongated member 74 so as to project into circular slot 86. Similarly, a second pin 98 extends through a suitable aperture in link arm 76 and projects through spacer 100 and into an aperture in base 72 at center point 82.

In the assembled view shown in FIG. 8, it can be seen that straight edge 90 intersects circular slot 86 on scale 78 at angle indication 90°, and also intersects circular slot 86 at scale 80 at angle 30° coinciding with angle reference point 94. Tapered end 102 of link arm 76 may be utilized to indicate the angle on scale 80 rather than using angle reference point 94 as desired.

If desired, link arm 76 and pin 98 may be deleted from this embodiment. In such an optional embodiment the pin 96 in circular slot 86 aids in maintaining the correct positioning of elongated member 74 with end 104 abutting surface 106 of guide wall 88. Another feature when link arm 76 is eliminated, is obtained by removing pin 96 from reference point 94 and inserting pin 96 into reference point 92. Now by placing elongated member 74 with end 104 at center point 82 and pin 96 inserted into center point 82, the elongated member can be used as a compass with center point 82 as the compass center.

All of the above-described embodiments of the present invention are much simpler to construct and to assemble and are therefore less expensive than such prior instruments. In addition, all of the embodiments described herein provide a precise trisecting operation and indication and are much more reliable and efficient in use compared to prior trisector devices.

The foregoing detailed description has been given for clearness of understanding only, and no unnecessary limitations should be understood therefrom, as modifications will be obvious to those skilled in the art.

I claim:

1. An angle trisecting device comprising:
   a base including a flat portion having a zero angle reference axis;
   angle indicating means on the base extending outwardly from a center point on said zero angle reference axis for selecting a first angle and indicating a second angle;
   a circular slot in said base centered about said center point and cooperating with said angle indicating means to provide angle indication points from the zero angle reference axis;
   an elongated slot in said base aligned with said center point and said zero angle reference axis;
   an elongated member having an elongated straight-edge portion and a defined-length portion at one end of the elongated member, said defined-length portion having a length equal to the radius of the circular slot,
   said defined-length portion having a base reference point and an angle reference point at opposite ends; and
   a first pin extending from the base reference point and removably captured within said elongated slot in said base, and a second pin extending through said angle reference point and removably captured within said circular slot in said base;
   wherein the elongated member is pivotable with respect to the elongated slot and the circular slot so that said second angle defined between the elongated straight-edge portion of said elongated member and said zero angle reference axis corresponds to a trisection of said first angle defined between said zero angle reference axis and a ray extending from said center point to said angle indication point on the circular slot.

2. An angle trisecting device according to claim 1, wherein said first and second pins are aligned with said straight-edge portion of said elongated member.

3. An angle trisecting device according to claim 1, wherein the linear distance between said first and second pins equals the radius of said circular slot.

4. An angle trisecting device comprising:
   a base, including a flat portion having a zero angle reference axis and an upstanding guide wall along one end of said base;
   angle indicating means on the base extending outwardly from a center point on said zero angle reference axis including means for selecting a first angle and means for indicating a second angle;
   a circular indicia on said base centered about said center point and cooperating with said angle indicia to provide angle indication points from the zero angle reference axis; and
   an elongated member having an elongated straight-edge portion and a defined-length portion at one end of the elongated member, said defined-length portion having a length equal to the radius of said circular indicia;
   said defined-length portion having a base reference point and an angle reference point at opposite ends and adapted such that when said one end of the elongated member abuts the upstanding guide wall, the base reference point is aligned with said center point and said zero angle reference axis, and said angle reference point coincides with said circular indicia;
   wherein the second angle defined between the angle reference point on said circular indicia and the elongated straight-edge portion of the elongated member corresponds to a trisection of the first angle defined between the zero angle reference axis and a ray extending from said center point to the angle indication point at the circular indicia.

5. An angle trisecting device according to claim 4, wherein said circular indicia includes a circular slot.

6. An angle trisecting device according to claim 5, including a pin extending from the angle reference point and removably captured within said circular slot.

7. An angle trisecting device according to claim 6, including a link arm pivotally mounted at one end to said pin, and pivot means for pivotally connecting the other end of said link arm to said center point.

8. An angle trisecting device according to claim 7, wherein said pivot means includes a second pin extending from the other end of said link arm.

9. An angle trisecting device according to claim 7, wherein said link arm one end includes a tapered end for indicating an angle indication point.

* * * * *